(12) United States Patent
Schwoerer et al.

(10) Patent No.: US 11,398,763 B2
(45) Date of Patent: Jul. 26, 2022

(54) LUBRICATION SYSTEM FOR AN ELECTRIC MOTOR

(71) Applicant: Caterpillar Inc., Peoria, IL (US)

(72) Inventors: Brandon Schwoerer, Washington, IL (US); Lance Cowper, Metamora, IL (US); Justin Krager, Germantown Hills, IL (US); Joshua Hicke, Glasford, IL (US); Mark Smith, Bartonville, IL (US)

(73) Assignee: Caterpillar Inc., Peoria, IL (US)

( * ) Notice: Subject to any disclaimer, the term of this patent is extended or adjusted under 35 U.S.C. 154(b) by 295 days.

(21) Appl. No.: 16/715,947

(22) Filed: Dec. 16, 2019

(65) Prior Publication Data

US 2021/0184543 A1   Jun. 17, 2021

(51) Int. Cl.
*H02K 9/197* (2006.01)
*H02K 7/00* (2006.01)
*H02K 5/20* (2006.01)

(52) U.S. Cl.
CPC ............. *H02K 9/197* (2013.01); *H02K 5/20* (2013.01); *H02K 7/003* (2013.01)

(58) Field of Classification Search
CPC ........... H02K 9/197; H02K 5/20; H02K 7/003
USPC ......... 310/52, 54, 58, 59, 60 A, 88–89, 114, 310/400
See application file for complete search history.

(56) References Cited

U.S. PATENT DOCUMENTS

| | | |
|---|---|---|
| 9,643,667 B2 | 5/2017 | Hansen |
| 9,755,475 B2 | 9/2017 | Karlsson et al. |
| 9,878,748 B2 | 1/2018 | Hellholm et al. |
| 9,969,252 B2 | 5/2018 | Engblom |
| 2011/0001400 A1* | 1/2011 | Chiba ................ F16D 1/10 310/67 R |
| 2014/0009016 A1* | 1/2014 | Seidenbinder ........... H02K 9/22 310/64 |
| 2018/0022407 A1 | 1/2018 | Lussier et al. |

FOREIGN PATENT DOCUMENTS

| | | |
|---|---|---|
| JP | 2014-231339 A | 12/2014 |
| JP | 2016168956 A * | 9/2016 |

\* cited by examiner

*Primary Examiner* — Jose A Gonzalez Quinones
(74) *Attorney, Agent, or Firm* — Harrity & Harrity LLP

(57) ABSTRACT

A lubrication system is disclosed. The lubrication system may include a mounting case, a tube internal to the mounting case that is configured to carry oil, and an electric motor. The electric motor may include a motor housing, a mounting flange extending radially from the motor housing, and an oil passageway in the mounting flange. The mounting flange may be mounted to the mounting case to provide a fluid connection between the oil passageway and the tube.

10 Claims, 4 Drawing Sheets

LUBRICATION SYSTEM FOR AN ELECTRIC MOTOR

TECHNICAL FIELD

The present disclosure relates generally to electric motors and, for example, to a lubrication system for an electric motor.

BACKGROUND

An electric motor may contain internal motor components, such as bearings, that are lubricated to reduce friction and wear. In some cases, oil, or another lubricating fluid, may be supplied to passageways within the electric motor for delivery to such internal motor components. For example, a series of hoses and/or tubes may be used to transport oil from a reservoir to the electric motor. In such cases, a flexible oil-supplying hose may be connected to the electric motor when the electric motor is mounted to a mounting case of a machine. Routing and connection of the hose to the electric motor may be difficult in the confines of the mounting case, and may be particularly difficult when dual electric motors are mounted to the mounting case, each utilizing a separate flexible hose that needs routing and connection. Moreover, such flexible hoses are susceptible to wear and deterioration over time and may require frequent replacement.

One attempt at a lubrication system is disclosed in U.S. Pat. No. 9,878,748 that issued to BAE Systems Hagglunds Aktiebolag on Jan. 30, 2018 ("the '748 patent"). In particular, the '748 patent discloses a drive unit for a tracked vehicle that includes at least one drive wheel and a set of support wheels that are rotatably attached to a track support beam. The '748 patent discloses that the drive unit further comprises an electric motor attached to the at least one drive wheel and integrated in the track support beam. Furthermore, the '748 patent discloses that the drive unit includes a lubrication system integrated into the track support beam and comprising a pump unit arranged for pressurized supply of lubricant to parts of the drive unit in need of lubrication. The '748 patent also indicates that the pump unit is configured to pressurize the lubricant in order to then lead out the pressurized lubricant to the different components of the drive unit via a pressure conduit. According to the '748 patent, the pressure conduit partly consists of a pipe which has been attached to the pump unit and runs through a hole in the front wall of the reservoir, with remaining parts of the pressure conduit being typically cast or drilled in a front section of the track support beam.

While the lubrication system of the '748 patent may provide lubrication to a drive unit that includes an electric motor, the '748 patent does not address providing lubrication to internal motor components of an electric motor via a mounting flange of the electric motor. Moreover, the '748 patent does not address routing and connection of an oil tube to an electric motor within a mounting case, and particularly, does not address routing and connection of dual oil tubes to dual electric motors within a mounting case.

The lubrication system of the present disclosure solves one or more of the problems set forth above and/or other problems in the art.

SUMMARY

According to some implementations, an electric motor may include a motor housing, a mounting flange extending radially from the motor housing, the mounting flange configured for attachment to a mounting case, and an oil passageway in the mounting flange, the oil passageway configured for fluid connection to a tube internal to the mounting case that is configured to carry oil.

According to some implementations, a lubrication system may include a mounting case; a tube internal to the mounting case, the tube configured to carry oil; and an electric motor including: a motor housing, a mounting flange extending radially from the motor housing, and an oil passageway in the mounting flange, the mounting flange being mounted to the mounting case to provide a fluid connection between the oil passageway and the tube.

According to some implementations, a method may include aligning an inlet of an oil passageway in a mounting flange of an electric motor to an outlet of a tube internal to a mounting case, the tube being configured to carry oil, and mounting the mounting flange to the mounting case, according to the alignment, to thereby provide a fluid connection between the oil passageway and the tube.

DETAILED DESCRIPTION

Figure 1:
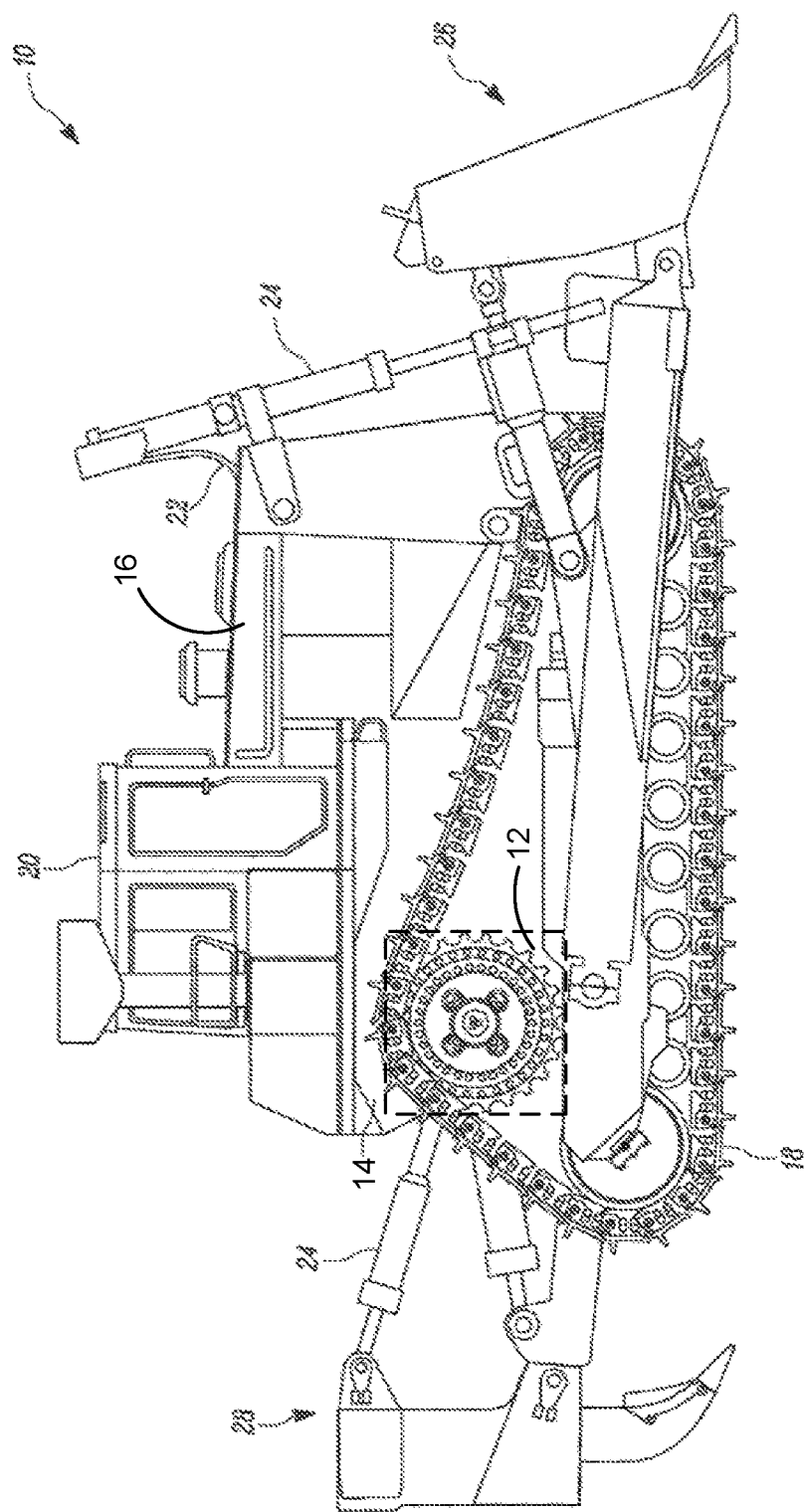
FIG. 1 is a diagram of an example machine that includes a lubrication system.

FIG. 1 is a diagram of an example machine 10 that includes a lubrication system 12 (as described in connection with FIGS. 2 and 3). As shown in FIG. 1, the machine 10 is embodied as a track type machine, such as a track type tractor. Alternatively, the machine 10 may be a backhoe loader, a skid steer loader, a wheel loader, a motor grader, an excavator, a scraper, an agricultural tractor, a haul truck, or the like.

As shown in FIG. 1, the machine 10 may include a frame assembly 14 and a power source 16. The power source 16 may include one or more batteries, one or more engines (e.g., diesel engines), one or more generators, and/or the like, configured to provide power to the machine 10. The machine 10 may also include a set of ground engaging members 18, such as wheels, tracks, rollers, or the like, for propelling the machine 10. Furthermore, the machine 10 may include an operator cabin 20, which may include one or more input devices (not shown), such as one or more push-buttons, control levers, steering wheels, or the like, for controlling and/or monitoring operations of the machine 10.

In some implementations, the machine 10 may include a hydraulic pump (not shown). The hydraulic pump may be operatively coupled to the power source 16 to provide pressurized hydraulic fluid via hoses 22 to hydraulic cylinders 24 for moving tools and implements of the machine 10, such as front attachment 26 and/or a rear attachment 28. The front attachment 26 may include a blade assembly, and/or the like. The rear attachment 28 may include a ripper assembly, a winch assembly, a drawbar assembly, and/or the like.

As indicated above, FIG. 1 is provided as an example. Other examples may differ from what is described in connection with FIG. 1.

Figure 2:
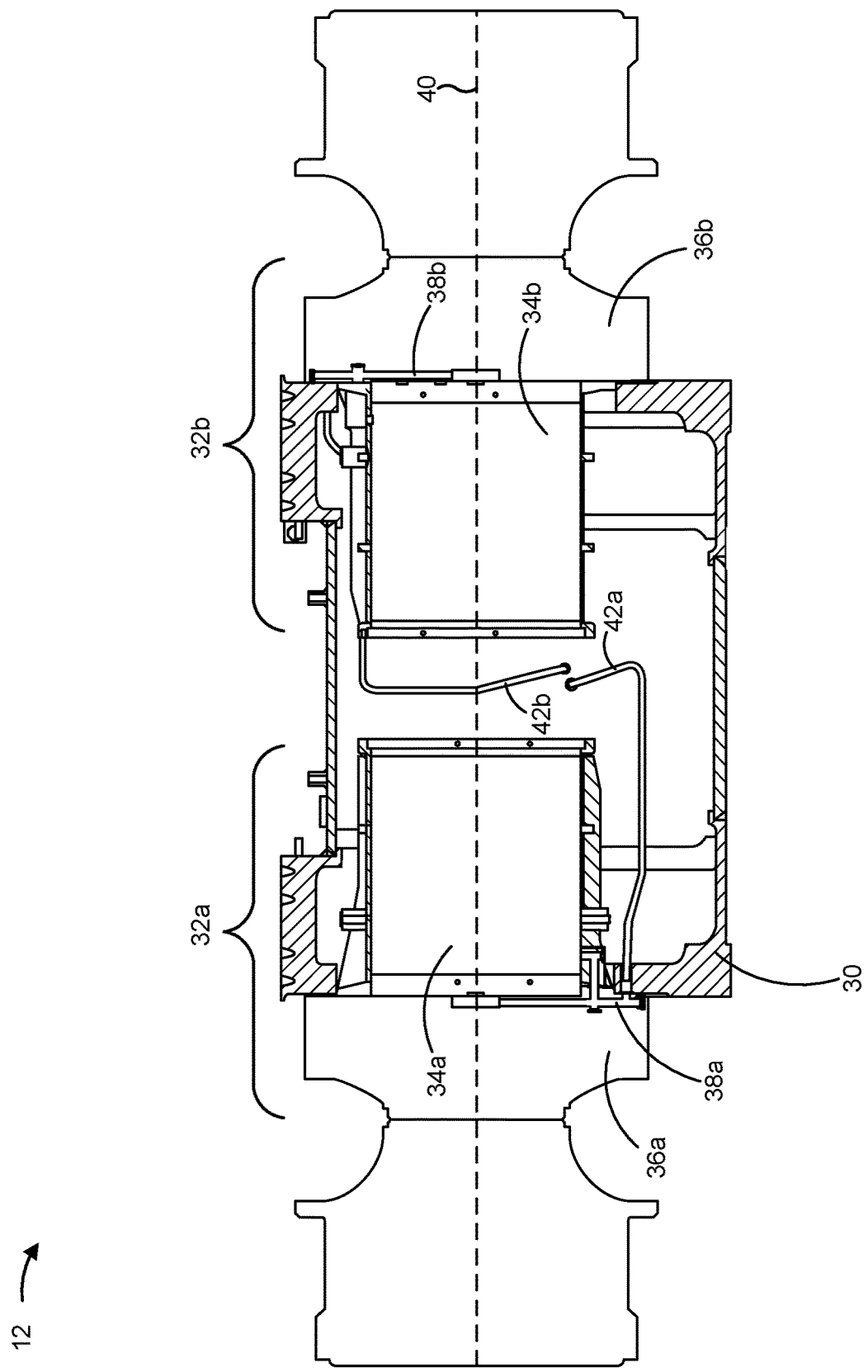
FIGS. 2 and 3 are diagrams of an example lubrication system that may be used with the machine of FIG. 1.

FIG. 2 is a diagram of an example lubrication system 12. In particular, FIG. 2 shows a cutaway view of a mounting case 30 (edges of which, according to the cutaway, are shown by shading) of the lubrication system 12 to show internal components of the mounting case 30. The mounting case 30 may be a component of the frame assembly 14 of the machine 10.

The mounting case 30 may provide a housing for mounting one or more electric motors. For example, as shown in FIG. 2, a first electric motor 32a and a second electric motor 32b may be mounted to the mounting case 30. The first electric motor 32a and the second electric motor 32b may be mounted to opposing sides of the mounting case 30, such that the first electric motor 32a and the second electric motor 32b extend toward each other along a common axis.

An electric motor 32 (e.g., the first electric motor 32a and/or the second electric motor 32b) may include a motor housing 34 (e.g., the first electric motor 32a may include a motor housing 34a and the second electric motor 32b may include a motor housing 34b) and a mounting flange 36 (e.g., the first electric motor 32a may include a mounting flange 36a and the second electric motor 32b may include a mounting flange 36b) extending radially from the motor housing 34. FIG. 2, shows a cutaway view of the mounting flange 36 to show internal components of the mounting flange 36. The motor housing 34 may have a first diameter and the mounting flange 36 may have a second diameter that is greater than the first diameter. Moreover, the mounting flange 36 may be configured for external attachment to the mounting case 30. In this way, the mounting flange 36 may be mounted at an external surface of the mounting case 30, such that the motor housing 34 extends into, and is internal to, the mounting case 30. The mounting flange 36 may include a plurality of apertures (not shown), extending through the mounting flange 36, and configured to receive mounting hardware (e.g., a plurality of bolts) for attachment of the mounting flange 36 to the mounting case 30. For example, respective mounting hardware may pass through the plurality of apertures into a corresponding plurality of apertures of the mounting case 30 to provide attachment of the mounting flange 36 to the mounting case 30.

The electric motor 32 may further include an oil passageway 38 (e.g., the first electric motor 32a may include an oil passageway 38a and the second electric motor 32b may include an oil passageway 38b) in the mounting flange 36. In some implementations, the mounting flange 36 may include more than one oil passageway 38 and/or other fluid passageway. An inlet of the oil passageway 38 may be located in the mounting flange 36 between first and second apertures of the plurality of apertures. The oil passageway 38 may be an internal bore of the mounting flange 36. For example, the oil passageway 38 may be a drilled, or otherwise machined, passageway in a body (e.g., a solid body) of the mounting flange 36. The oil passageway 38 may be configured to carry and direct oil, or another lubricant, to internal motor components, such as bearings, of the electric motor 32 (e.g., internal motor components housed in the motor housing 34) to provide lubrication and/or cooling of the internal motor components. For example, the oil passageway 38 may connect to one or more conduits located in the motor housing 34, to thereby supply oil to internal motor components of the motor housing 34.

In some implementations, a first oil passageway 38a and a second oil passageway 38b may be configured to supply oil to the first electric motor 32a and the second electric motor 32b, respectively. In such cases, an inlet of the first oil passageway 38a and an inlet of the second oil passageway 38b may interface with (e.g., attach to, abut, enter, and/or the like) opposing walls of the mounting case 30 (e.g., at an exterior of the mounting case 30). Moreover, the inlet of the first oil passageway 38a may be located in a first mounting flange 36a below a plane 40, and the inlet of the second oil passageway 38b may be located in a second mounting flange 36b above the plane 40. The plane 40 may bifurcate the first mounting flange 36a and the second mounting flange 36b into respective upper and lower portions (e.g., equal upper and lower portions). Furthermore, the inlet of the first oil passageway 38a may be located in the first mounting flange 36a forward of a plane perpendicular to the plane 40, and the inlet of the second oil passageway 38b may be located in the second mounting flange 36b rearward of the plane perpendicular to the plane 40. The plane perpendicular to the plane 40 may bifurcate the first mounting flange 36a and the second mounting flange 36b into respective forward and rear portions (e.g., equal forward and rear portions).

As further shown in FIG. 2, the mounting case 30 may house one or more tubes configured to carry fluids within the mounting case 30. For example, a first tube 42a and a second tube 42b may be internal to the mounting case 30 and configured to carry oil. An inlet of a tube 42 (e.g., the first tube 42a and/or the second tube 42b) may terminate at, or in, a wall of the mounting case 30 to provide a fluid connection with an external conduit (e.g., a hose). For example, the inlet of the tube 42 may have a fluid connection with the external conduit via a passageway in the wall of the mounting case 30. The external conduit, in association with a pump, may supply oil from an external oil reservoir to the tube 42. Similarly, an outlet of the tube 42 may terminate at, or in, a wall of the mounting case 30 to provide a fluid connection with the oil passageway 38. For example, the outlet of the tube 42 may have a fluid connection with the oil passageway 38 via a passageway in the wall of the mounting case 30, as described below in connection with FIG. 3. In some implementations, multiple tubes 42 may have respective fluid connections with multiple oil passageways 38, and/or other fluid passageways, of the mounting flange 36, as described herein.

A tube 42 (e.g., the first tube 42a and/or the second tube 42b) may be in a fixed position relative to the mounting case 30. For example, the tube 42 may be rigid (e.g., non-flexible), such that the tube 42 maintains a position during operation of the machine 10, during connection of an electric motor 32 to the mounting case 30, and/or the like. As an example, the tube 42 may be a metal (e.g., steel) tube, a polyvinyl chloride (PVC) tube, and/or the like.

In some implementations, the first tube 42a and the second tube 42b may be configured in the mounting case 30 to supply oil to the first electric motor 32a and the second electric motor 32b, respectively. In such cases, an outlet of the first tube 42a and an outlet of the second tube 42b may interface with (e.g., attach to, abut, enter, and/or the like) opposing walls of the mounting case 30 (e.g., at an interior of the mounting case 30). Moreover, the outlet of the first tube 42a may be located below the plane 40, and the outlet of the second tube 42b may be located above the plane 40. Furthermore, the outlet of the first tube 42a may be located forward of the plane perpendicular to the plane 40, and the outlet of the second tube 42b may be located rearward of the plane perpendicular to the plane 40.

As indicated above, FIG. 2 is provided as an example. Other examples may differ from what is described in connection with FIG. 2.

Figure 3:
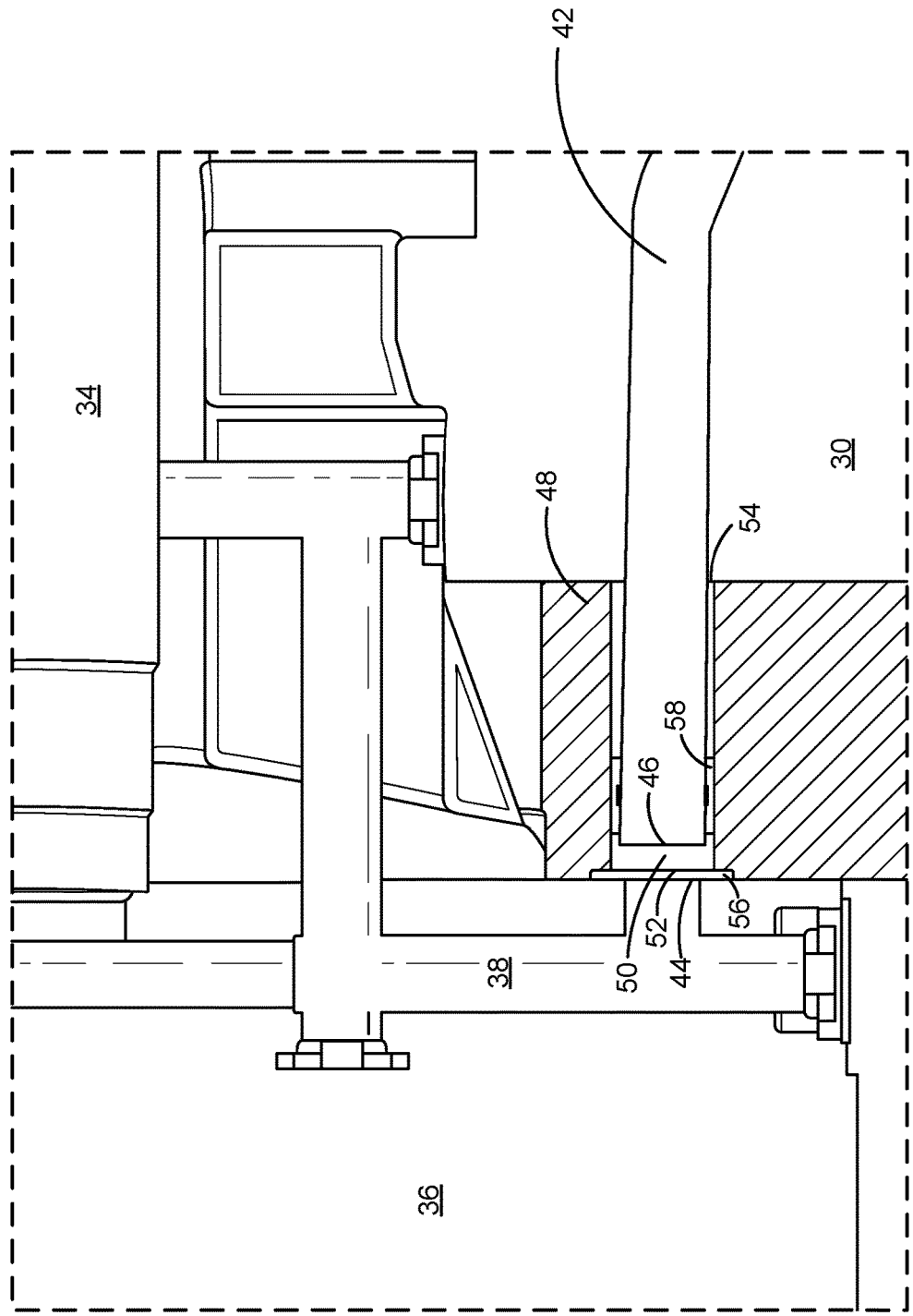

FIG. 3 is a diagram of the example lubrication system 12. In particular, FIG. 3 shows an enlarged view of an interface between an oil passageway 38 and a tube 42 of the lubrication system 12, as shown in FIG. 2. The oil passageway 38 may be configured for fluid connection to the tube 42. For example, an inlet 44 of the oil passageway 38 may connect directly, or indirectly, to an outlet 46 of the tube 42. In some implementations, the oil passageway 38 may be configured for fluid connection to the tube 42 via a wall 48 of the mounting case 30. For example, the oil passageway 38 and the tube 42 may interface with (e.g., attach to, abut, enter, and/or the like) opposing ends of a passageway 50 in the wall 48 of the mounting case 30.

The passageway 50 may be the sole interface (e.g., the sole fluid connection) between the oil passageway 38 and the tube 42. In other words, a connection between the oil passageway 38 and the tube 42 may not be by one or more hoses and/or one or more additional tubes. For example, the inlet 44 of the oil passageway 38 may connect to an outlet 52 of the passageway 50, and the outlet 46 of the tube 42 may connect to an inlet 54 of the passageway 50.

The inlet 44 of the oil passageway 38 may connect to the outlet 52 of the passageway 50 at a gasket joint 56 (e.g., an O-ring). For example, the inlet 44 of the oil passageway 38 may abut, and compress, the gasket joint 56 when a mounting flange 36 of an electric motor 32 is mounted to the mounting case 30. The outlet 46 of the tube 42 may connect to the inlet 54 of the passageway 50 at a mechanical joint 58 (e.g., a sealed joint). In some implementations, the outlet 46 of the tube 42 may connect to the inlet 54 of the passageway 50 at an internal location of the passageway 50. For example, as shown in FIG. 3, the mechanical joint 58 may be located in the passageway 50. In such a case, the inlet 54 of the passageway 50 may encompass any location of the passageway 50 that is before the outlet 52 of the passageway 50 (e.g., in a direction of oil flow), and the outlet 52 of the passageway 50 may encompass any location of the passageway 50 that is after the inlet 54 (e.g., in a direction of oil flow).

As indicated above, FIG. 3 is provided as an example. Other examples may differ from what is described in connection with FIG. 3.

Figure 4:
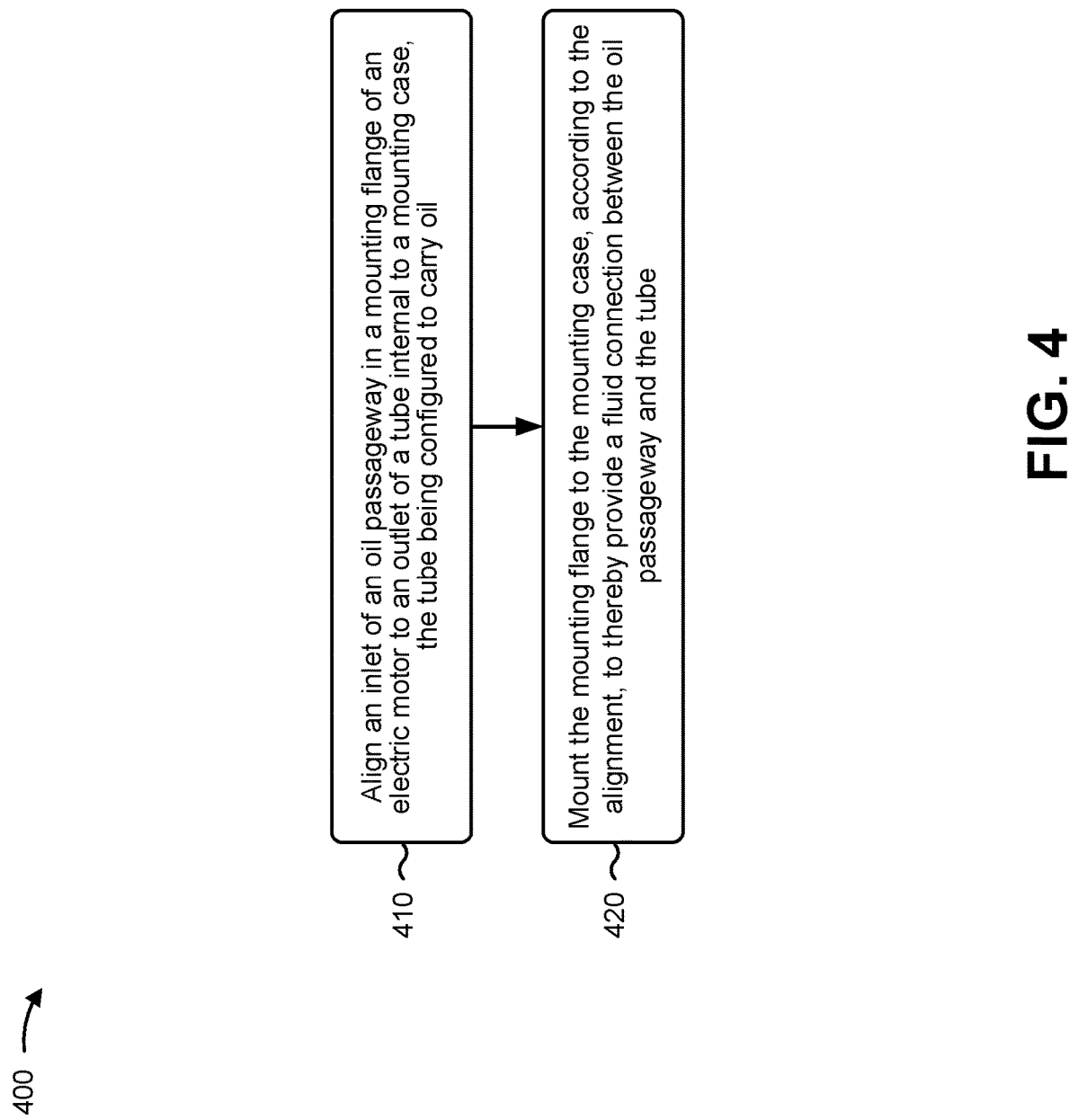
FIG. 4 is a flow chart of an example process for connection of an electric motor to a lubrication system.

FIG. 4 is a flow chart of an example process 400 for connection of an electric motor to a lubrication system. In some implementations, one or more process blocks of FIG. 4 may be performed by a machine.

As shown in FIG. 4, process 400 may include aligning an inlet (e.g., inlet 44) of an oil passageway (e.g., oil passageway 38) in a mounting flange (e.g., mounting flange 36) of an electric motor 32 (e.g., electric motor 32) to an outlet (e.g., outlet 46) of a tube (e.g., tube 42) internal to a mounting case (e.g., mounting case 30) (block 410). For example, aligning the inlet of the oil passageway to the outlet of the tube may include orienting the electric motor with respect to the mounting case, such that the inlet of the oil passageway and the outlet of the tube align. In some implementations, aligning the inlet of the oil passageway to the outlet of the tube may include aligning the inlet of the oil passageway with an outlet (e.g., outlet 52) of a passageway (e.g., passageway 50) through a wall (e.g., wall 48) of the mounting case. For example, this may cause alignment of the inlet of the oil passageway with the outlet of the tube when an inlet (e.g., inlet 54) of the passageway is connected to the outlet of the tube.

As further shown in FIG. 4, process 400 may include mounting the mounting flange to the mounting case, according to the alignment, to thereby provide a fluid connection between the oil passageway and the tube (block 420). Mounting the mounting flange to the mounting case may include inserting mounting hardware (e.g., bolts) into a plurality of apertures in the mounting flange, such that the mounting hardware is received in a corresponding plurality of apertures of the mounting case. The fluid connection between the oil passageway and the tube may occur by mounting the mounting flange to the mounting case without an additional step of connecting a conduit (e.g., a hose) between the oil passageway and the tube.

In some implementations, process 400 may further include aligning an inlet of an oil passageway in a mounting flange of another electric motor to an outlet of another tube internal to the motor case, and mounting the mounting flange to the motor case, according to the alignment, to thereby provide a fluid connection between the oil passageway of the other electric motor and the other tube, as described above. The electric motor and the other electric motor may be mounted to opposing sides of the mounting case, such that an inlet of the oil passageway in the mounting flange of the electric motor is located below a plane that bifurcates the mounting flange of the electric motor and the mounting flange of the other electric motor, and an inlet of the oil passageway in the mounting flange of the other electric motor is located above the plane.

Although FIG. 4 shows example blocks of process 400, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The disclosed lubrication system may be used with any machine employing one or more electric motors. In particular, the disclosed lubrication system may enable an electric motor to be fluidly connected to an oil-carrying tube as part of a process for connecting the electric motor (e.g., a mounting flange of the electric motor) to a mounting case of a machine. This may be accomplished by including an oil passageway in a mounting flange of the electric motor, such that the oil passageway fluidly connects to the oil-carrying tube in the mounting case when the electric motor is mounted to the mounting case. In this way, additional connection steps, such as connecting a hose between the electric motor and the oil-carrying tube in order to establish a fluid connection for supplying oil, may be eliminated.

What is claimed is:

1. A lubrication system, comprising:
   a mounting case;
   a tube internal to the mounting case,
      the tube configured to carry oil; and
   an electric motor, comprising:
      a motor housing;
      a mounting flange extending radially from the motor housing; and
      an oil passageway in the mounting flange,
         the mounting flange being mounted to the mounting case to provide a fluid connection between the oil passageway and the tube,
      wherein the electric motor is a first electric motor, the motor housing is a first motor housing, the mounting flange is a first mounting flange, and the oil passageway is a first oil passageway, and
   a second electric motor, comprising:
      a second motor housing;
      a second mounting flange extending radially from the second motor housing; and
      a second oil passageway in the second mounting flange,
   wherein the tube is a first tube, and wherein the second mounting flange is mounted to the mounting case to provide a fluid connection between the second oil passageway and a second tube, wherein an inlet of the first oil passageway is located in the first mounting flange below a plane that bifurcates the first mounting flange and the second mounting flange, and an inlet of the second oil passageway is located in the second mounting flange above the plane.

2. The lubrication system of claim 1, wherein the tube is in a fixed position relative to the mounting case.

3. The lubrication system of claim 1, wherein the tube is rigid.

4. The lubrication system of claim 1, wherein a sole interface between the oil passageway and the tube is a passageway through a wall of the mounting case.

5. The lubrication system of claim 1, wherein the tube is connected to an inlet of a passageway through a wall of the mounting case, and the oil passageway is connected to an outlet of the passageway.

6. A method, comprising:
aligning an inlet of an oil passageway in a mounting flange of an electric motor to an outlet of a tube internal to a mounting case,
the tube being configured to carry oil; and
mounting the mounting flange to the mounting case, according to the alignment, to thereby provide a fluid connection between the oil passageway and the tube,
wherein the electric motor is a first electric motor, the mounting flange is a first mounting flange, the oil passageway is a first oil passageway, and the tube is a first tube;

aligning an inlet of a second oil passageway in a second mounting flange of a second electric motor to an outlet of a second tube internal to the mounting case, the second tube being configured to carry oil; and mounting the second mounting flange to the mounting case, according to the alignment, to thereby provide a fluid connection between the second oil passageway and the second tube, wherein the inlet of the first oil passageway is located in the first mounting flange below a plane that bifurcates the first mounting flange and the second mounting flange, and the inlet of the second oil passageway is located in the second mounting flange above the plane.

7. The method of claim 6, wherein the mounting flange includes a plurality of apertures associated with mounting hardware, and
wherein the inlet of the oil passageway is located in the mounting flange between a first aperture and a second aperture of the plurality of apertures.

8. The method of claim 6, wherein the tube is in a fixed position relative to the mounting case.

9. The method of claim 6, wherein the mounting flange is mounted external to the mounting case.

10. The method of claim 6, wherein aligning the inlet of the oil passageway to the outlet of the tube comprises:
aligning the inlet of the oil passageway with an outlet of a passageway through a wall of the mounting case,
wherein an inlet of the passageway is connected to the outlet of the tube.

* * * * *